(12) United States Patent
Hagiwara et al.

(10) Patent No.: US 11,649,364 B2
(45) Date of Patent: May 16, 2023

(54) INK, INKJET PRINTING METHOD, AND PRINTED MATTER

(71) Applicant: RICOH COMPANY, LTD., Tokyo (JP)

(72) Inventors: Hiroki Hagiwara, Kanagawa (JP); Tomohiro Nakagawa, Kanagawa (JP); Yuki Kaji, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 911 days.

(21) Appl. No.: 16/573,043

(22) Filed: Sep. 17, 2019

(65) Prior Publication Data

US 2020/0095444 A1 Mar. 26, 2020

(30) Foreign Application Priority Data

Sep. 25, 2018 (JP) .............................. JP2018-178898

(51) Int. Cl.
| | | |
|---|---|---|
| *C09D 11/00* | (2014.01) | |
| *C09D 11/38* | (2014.01) | |
| *C09D 11/322* | (2014.01) | |
| *C09D 11/326* | (2014.01) | |
| *C09D 11/40* | (2014.01) | |
| *C09D 1/00* | (2006.01) | |
| *C09D 4/00* | (2006.01) | |
| *C09D 5/00* | (2006.01) | |
| *C09K 3/00* | (2006.01) | |
| *B41J 2/21* | (2006.01) | |

(52) U.S. Cl.
CPC ............ *C09D 11/38* (2013.01); *C09D 11/322* (2013.01); *C09D 11/326* (2013.01); *C09D 11/40* (2013.01); *B41J 2/21* (2013.01)

(58) Field of Classification Search
CPC .......... C09D 11/38; C09D 11/00; C09D 1/00; C09D 4/00; C09D 5/00; B41J 2/21; C09K 3/00
USPC ........................ 106/31.01, 31.13, 31.58, 31.6
See application file for complete search history.

(56) References Cited

U.S. PATENT DOCUMENTS

| 7,414,082 B2 * | 8/2008 | Hirasa ................. C09D 11/324 523/160 |
| 2010/0232865 A1 * | 9/2010 | Kitaoka ................. B43K 24/08 401/209 |
| 2014/0364548 A1 | 12/2014 | Everhardus et al. |

(Continued)

FOREIGN PATENT DOCUMENTS

| EP | 2 960 308 A1 | 12/2015 |
| JP | 2001-106949 | 4/2001 |

(Continued)

OTHER PUBLICATIONS

Robert F. Fedors, "A Method for Estimating Both the Solubility Parameters and Molar Volumes of Liquids" Polymer Engineering and Science, Feb. 1974, vol. 14, No. 2, p. 147-p. 154.

(Continued)

*Primary Examiner* — James E McDonough
(74) *Attorney, Agent, or Firm* — Grüneberg and Myers, PLLC

(57) ABSTRACT

An ink is provided. The ink comprises a colorant, water, an organic solvent comprising a glycol ether having a solubility parameter of from 9.0 to 12.0 $(cal/cm^3)^{1/2}$, and a surfactant comprising a silicone-based surfactant (a) and a nonionic surfactant (b).

18 Claims, 1 Drawing Sheet

(56) References Cited

U.S. PATENT DOCUMENTS

| | | |
|---|---|---|
| 2014/0377516 A1 | 12/2014 | Toda et al. |
| 2015/0050467 A1 | 2/2015 | Nakagawa et al. |
| 2015/0077479 A1 | 3/2015 | Nakagawa et al. |
| 2015/0077482 A1 | 3/2015 | Toda et al. |
| 2015/0116433 A1 | 4/2015 | Fujii et al. |
| 2015/0138284 A1 | 5/2015 | Nagashima et al. |
| 2015/0191614 A1 | 7/2015 | Nagashima et al. |
| 2015/0259553 A1 | 9/2015 | Nakagawa et al. |
| 2015/0329731 A1 | 11/2015 | Fujii et al. |
| 2015/0361282 A1 | 12/2015 | Nakagawa et al. |
| 2015/0368492 A1 | 12/2015 | Fujii et al. |
| 2016/0032122 A1 | 2/2016 | Toda et al. |
| 2016/0032125 A1* | 2/2016 | Ohori .................. C09D 11/328 106/31.48 |
| 2016/0068697 A1 | 3/2016 | Toda et al. |
| 2016/0102220 A1 | 4/2016 | Kido et al. |
| 2016/0264808 A1 | 9/2016 | Kido et al. |
| 2016/0272834 A1 | 9/2016 | Kobayashi et al. |
| 2016/0355695 A1 | 12/2016 | Nakagawa et al. |
| 2017/0022380 A1 | 1/2017 | Nakagawa et al. |
| 2017/0051170 A1 | 2/2017 | Nakagawa et al. |
| 2017/0107389 A1 | 4/2017 | Umemura et al. |
| 2017/0247561 A1 | 8/2017 | Nakagawa et al. |
| 2018/0030298 A1 | 2/2018 | Yamazaki et al. |
| 2018/0187034 A1 | 7/2018 | Takeno et al. |
| 2019/0016911 A1 | 1/2019 | Okamoto et al. |
| 2019/0077978 A1 | 3/2019 | Suzuki et al. |
| 2019/0168516 A1 | 6/2019 | Nakagawa et al. |
| 2020/0199387 A1 | 6/2020 | Utsugi et al. |

FOREIGN PATENT DOCUMENTS

| | | |
|---|---|---|
| JP | 2003-268274 | 9/2003 |
| JP | 2013-189597 | 9/2013 |
| JP | 2013-216862 | 10/2013 |
| JP | 2014-205768 | 10/2014 |
| JP | 2015-515510 | 5/2015 |
| JP | 2016-020455 | 2/2016 |
| JP | 2016-027107 | 2/2016 |
| JP | 2016-175265 | 10/2016 |
| JP | 2016-176016 | 10/2016 |
| JP | 2017-008319 | 1/2017 |
| JP | 2017-078158 | 4/2017 |
| JP | 2017-128117 | 7/2017 |
| JP | 2017-165809 | 9/2017 |
| JP | 2018-053035 | 4/2018 |
| JP | 2018-053171 | 4/2018 |
| JP | 6375019 | 8/2018 |
| WO | WO 2013/131924 A1 | 9/2013 |
| WO | WO 2017/122818 A1 | 7/2017 |
| WO | WO 2017/159685 A1 | 9/2017 |

OTHER PUBLICATIONS

Japanese Office Action dated May 11, 2022, in Japanese Patent Application No. 2018-178898 with English translation, 7 pages.

Japanese Third-Party Publication Submission Papers dated Oct. 22, 2021, in Japanese Patent Application No. 2018-178898, with English translation, 6 pages.

Japanese Third-Party Publication Submission Papers dated Feb. 14, 2022, in Japanese Patent Application No. 2018-178898, with English translation, 17 pages.

Japanese Notice of submission of Publications dated Oct. 26, 2021, in Japanese Patent Application No. 2018-178898, with English translation, 2 pages.

Japanese Notice of submission of Publications dated Mar. 4, 2022, in Japanese Patent Application No. 2018-178898, with English translation, 2 pages.

Extended European Search Report dated Mar. 6, 2020 in European Patent Application No. 19197191.0, citing documents AO through AR therein, 6 pages.

* cited by examiner

INK, INKJET PRINTING METHOD, AND PRINTED MATTER

CROSS-REFERENCE TO RELATED APPLICATIONS

This patent application is based on and claims priority pursuant to 35 U.S.C. § 119(a) to Japanese Patent Application No. 2018-178898, filed on Sep. 25, 2018, in the Japan Patent Office, the entire disclosure of which is hereby incorporated by reference herein.

BACKGROUND

Technical Field

The present disclosure relates to an ink, an inkjet printing method, and printed matter.

Description of the Related Art

Inkjet printers are now widely used at home as an output device of digital signals since they are relatively quiet, enjoy low running costs, and are capable of easily printing color images.

In recent years, inkjet printing techniques have been developed not only for home use but also for formation of an image on packaging materials for foods, beverages, daily necessities, etc.

In addition, inks for non-absorptive recording media (e.g., plastic films) have been developed.

Such inkjet printing techniques directly on plastic films are needed in, for example, printing packaging materials for foods and daily necessities. In such applications, the printed matter is required to have very high image quality because the printed matter is looked at a close distance in many opportunities.

On the other hand, there are various types of non-absorptive recording media with different types of substrate. Since wettability of ink depends on the surface energy of the substrate, the image quality depends on the type of the substrate.

SUMMARY

In accordance with some embodiments of the present invention, an ink is provided. The ink comprises a colorant, water, an organic solvent comprising a glycol ether having a solubility parameter of from 9.0 to 12.0 $(cal/cm^3)^{1/2}$, and a surfactant comprising a silicone-based surfactant (a) and a nonionic surfactant (b).

In accordance with some embodiments of the present invention, an inkjet printing method is provided. The inkjet printing method includes the process of discharging the above-described ink.

In accordance with some embodiments of the present invention, printed matter is provided. The printed matter comprises a print medium and a print layer. The print layer comprises a colorant, an organic solvent comprising a glycol ether having a solubility parameter of from 9.0 to 12.0 $(cal/cm^3)^{1/2}$, and a surfactant comprising a silicone-based surfactant (a) and a nonionic surfactant (b).

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
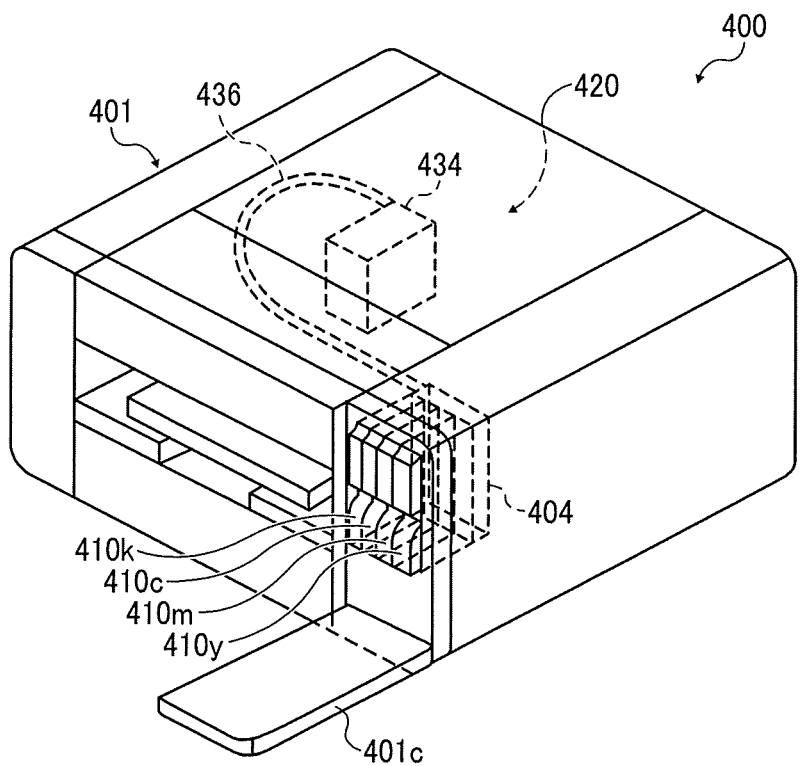
FIG. 1 is a schematic view of a recording apparatus using an ink according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

JP-5928027-B (corresponding to JP-2013-189597-A) proposes an ink containing two types of silicone-based surfactants, in attempting to provide an ink suitable for printing on a vinyl chloride substrate, which is a poorly-absorptive substrate, with little change in surface tension even after a long-term storage and without deterioration of printability (e.g., wettability) over time.

JP-5978513-B (corresponding to JP-2013-216862-A) proposes an ink combining specific water-soluble organic solvents for controlling wettability and drying property, in attempting to provide an ink suitable for printing on a poorly-absorptive substrate such as a vinyl chloride substrate.

However, there has not been reported an ink which exhibits uniform wettability and spreadability on non-absorptive substrates (e.g., plastic films) that are less absorptive than poorly-absorptive substrates (e.g., vinyl chloride) regardless of the type of substrate, to provide high-quality images.

The present invention has been achieved in view of the current situation. An object of the present invention is to provide an ink that exhibits uniform wettability to non-absorptive plastic substrates having different surface energies regardless of the type of substrate.

In accordance with an embodiment of the present invention, an ink is provided that exhibits uniform wettability to non-absorptive plastic substrates having different surface energies regardless of the type of substrate.

The ink according to an embodiment of the present invention comprises a colorant, water, an organic solvent, and a surfactant. The organic solvent comprises a glycol ether having a solubility parameter of from 9.0 to 12.0 $(cal/cm^3)^{1/2}$. The surfactant comprises a silicone-based surfactant (a) and a nonionic surfactant (b). This ink exhibits uniform wettability and spreadability on non-absorptive substrates regardless of the type of substrate and therefore provides a print image with excellent quality. Although the reason why uniform wettability and spreadability are exhibited has not been cleared yet, it is considered that the combination of the glycol ether having a solubility parameter of from 9.0 to 12.0 $(cal/cm^3)^{1/2}$, the silicone-based surfactant, and the nonionic surfactant has brought the surface free energy of the ink close to that of the non-absorptive substrate.

When the glycol ether is a propylene glycol alkyl ether, wettability and spreadability on the non-absorptive substrate becomes more uniform, which is desirable. It is particularly desirable that the glycol ether be a propylene glycol monomethyl ether.

Moreover, when the silicone-based surfactant (a) is a compound represented by following structural formula (1), uniform wettability and spreadability are exhibited regardless of the type of non-absorptive substrate, which is preferable:

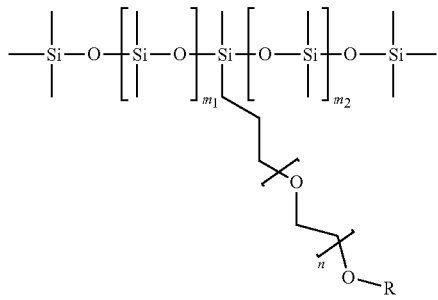

Structural Formula (1)

where R represents a hydrogen atom or methyl group, each of $m_1$ and $m_2$ independently represents an integer of from 0 to 6, and n represents an integer of from 3 to 19.

Furthermore, when the nonionic surfactant (b) has a hydrophilic-lipophilic balance (hereinafter "HLB") of from 3.0 to 7.0, uniform wettability and spreadability are exhibited regardless of the type of non-absorptive substrate, which is preferable.

Hereinafter, each component of the ink according to an embodiment of the present invention is described in detail below.

Glycol Ether having SP of from 9.0 to 12.0 $(cal/cm^3)^{1/2}$

The organic solvent contained in the ink comprises a glycol ether having a solubility parameter (hereinafter "SP") of from 9.0 to 12.0 $(cal/cm^3)^{1/2}$.

Specific examples of the glycol ether include the following:

2-methoxyethanol (SP=10.7 $(cal/cm^3)^{1/2}$), 2-ethoxyethanol (SP=10.4 $(cal/cm^3)^{1/2}$), 3-methoxybutanol (SP=10.9 $(cal/cm^3)^{1/2}$), 1-methoxy-2-propanol (propylene glycol-1-monomethyl ether) (SP=10.2 $(cal/cm^3)^{1/2}$), 2-methoxy-1-propanol (propylene glycol-2-methyl ether) (SP=10.2 $(cal/cm^3)^{1/2}$), ethylene glycol monobutyl ether (SP=10.0 $(cal/cm^3)^{1/2}$), 3-methoxy-3-methyl-1-butanol (SP=9.6 $(cal/cm^3)^{1/2}$), 2,2'-oxybis-1-propanol (SP=11.7 $(cal/cm^3)^{1/2}$), propylene glycol n-propyl ether (SP=9.8 $(cal/cm^3)^{1/2}$), propylene glycol n-butyl ether (SP=9.7 $(cal/cm^3)^{1/2}$), dipropylene glycol methyl ether (SP=9.7 $(cal/cm^3)^{1/2}$), diethylene glycol monoethyl ether (SP=10.9 $(cal/cm^3)^{1/2}$), dipropylene glycol n-propyl ether (SP=9.5 $(cal/cm^3)^{1/2}$), dipropylene glycol n-butyl ether (SP=9.4 $(cal/cm^3)^{1/2}$), tripropylene glycol methyl ether (SP=9.4 $(cal/cm^3)^{1/2}$), and tripropylene glycol n-butyl ether (SP=9.3 $(cal/cm^3)^{1/2}$).

Of these glycol ethers, preferred is a propylene glycol alkyl ether, and particularly preferred is a propylene glycol monomethyl ether (i.e., 1-methoxy-2-propanol and 2-methoxy-1-propanaol), for wettability and spreadability on non-absorptive substrates.

The SP is preferably in the range of from 9.3 to 11.7 $(cal/cm^3)^{1/2}$.

Preferably, the proportion of the glycol ether having a solubility parameter of from 9.0 to 12.0 $(cal/cm^3)^{1/2}$ in the ink is from 1% to 20% by mass, particularly preferably from 3% to 15% by mass, for wettability, dischargeability, and drying property.

Solubility parameter (SP) is widely used as an index of affinity and solubility of materials, such as solvents, resins, and pigments, which are used dissolved or dispersed in water or solvents. Various methods have been proposed for calculating SP, such as a method of experimentally measuring SP, a method of calculating SP from measured physical property values (e.g., immersion heat), and a method of calculating SP from the molecular structure. In the present disclosure, the method of calculating SP from the molecular structure, proposed by Fedors, is used to calculate SP. This method is advantageous in that SP can be calculated as long as the molecular structure is known and that the difference between the calculated value and the experimentally measured value is small. In the Fedors' method, SP is calculated from the evaporation energy Δei and the molar volume Δvi of each atom or atomic group at 25 degrees C. based on the following formula (A).

$$SP=(\Sigma\Delta ei/\Sigma\Delta vi)^{1/2}$$ Formula (A)

In the present disclosure, SP values are those calculated from the molecular structure based on the Fedors' method, and the unit thereof is $(cal/cm^3)^{1/2}$. In addition, only SP values at 25 degrees C. without temperature conversion are used in the present disclosure.

SP values can be calculated based on the Fedors' method described in a reference document "R. F. Fedors, Polym. Eng. Sci., 14 [2], 147-154".

Surfactant

The surfactant contained in the ink comprises a silicone-based surfactant and a nonionic surfactant in combination. The surfactant may further comprise a fluorine-based surfactant, an ampholytic surfactant, and/or an anionic surfactant.

The combined use of a silicone-based surfactant and a nonionic surfactant makes it possible for the ink to exhibit uniform wettability and spreadability regardless of the type of non-absorptive substrate.

The silicone-based surfactant is not particularly limited and can be suitably selected to suit to a particular application. Preferred are silicone-based surfactants which are not decomposed even in a high pH environment. Specific examples thereof include, but are not limited to, side-chainmodified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure on a side chain which is bound to Si.

The silicone-based surfactant is not particularly limited and can be suitably selected to suit to a particular application. When the silicone-based surfactant is represented by the following structural formula (1), the ink exhibits uniform wettability and spreadability regardless of the type of non-absorptive substrate, which is particularly preferable:

Structural Formula (1)

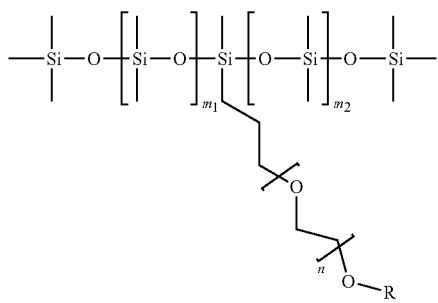

where R represents a hydrogen atom or methyl group, each of $m_1$ and $m_2$ independently represents an integer of from 0 to 6, and n represents an integer of from 3 to 19.

Specific examples of the silicone-based surfactant include, but are not limited to, BYK-345, 347, 348, and 349 (available from BYK Additives & Instruments), WET 240, 270, and 280 (available from Evonik Industries AG), and SAG 002, 013, and 503 A (available from Nissin Chemical Industry Co., Ltd.).

Preferably, the proportion of the silicone-based surfactant in the ink is in the range of from 0.1% to 3.0% by mass for wettability to media.

Here, the nonionic surfactant is defined as a general term which refers to a compound having a hydrophilic group and a hydrophobic group and free of a group capable of dissociating into ions. The nonionic surfactant is not particularly limited and can be suitably selected to suit to a particular application. Examples thereof include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan fatty acid esters, polyoxyethylene sorbitan fatty acid esters, glycerin fatty acid esters, and ethylene oxide adducts of acetylene alcohol. Specific examples thereof include, but are not limited to: SURFYNOL 104E (HLB=4.0), SURFYNOL 420 (HLB=4.0), SURFYNOL 440 (HLB=8.0), SURFYNOL SE-F (HLB=6.0), SURFYNOL 465 (HLB=13.0), SURFYNOL 2502 (HLB=8.0), and EnviroGem® AD01 (HLB=4.0), available from Nissin Chemical Industry Co., Ltd.; and RHEODOL MO-60 (HLB=2.8), EMASOL L-10V (HLB=8.6), RHEODOL AO-15V (HLB=3.7), and EMULGEN 102 KG (HLB=6.3), available from Kao Corporation.

Preferably, the proportion of the nonionic surfactant in the ink is in the range of from 0.01% to 2.0% by mass for wettability to media.

Preferably, the nonionic surfactant has an HLB of from 3.0 to 7.0 for wettability and spreadability on non-absorptive substrates.

Here, HLB (hydrophilic-lipophilic balance) indicates the balance between hydrophilic groups and lipophilic groups in the surfactant. HLB takes a value in the range of from 0 to 20. The closer the HLB to 0, the higher the lipophilicity. The closer the HLB to 20, the higher the hydrophilicity. HLB is defined by the following formula (the Griffin's method).

$HLB = 20 \times$(total formula weight of hydrophilic units/ molecular weight)

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain, each of which have weak foaming property. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on its side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the anionic surfactants include, but are not limited to, acetate, dodecylbenzene sulfonate, and laurate of polyoxyethylene alkyl ether, and polyoxyethylene alkyl ether sulfate.

The medium of the ink is a water-based medium. It is possible to further add articles other than water, such as water-soluble organic solvents, surfactants, and trace additives, in addition to the above-described organic solvents and surfactants.

Organic Solvent

The ink contains a glycol ether having a solubility parameter of from 9.0 to 12.0 $(cal/cm^3)^{1/2}$ as the organic solvent and may optionally contain other organic solvents.

The organic solvents other than the glycol ether are not particularly limited and water-soluble organic solvents can be used. Examples thereof include, but are not limited to, polyols, ethers such as polyol alkyl ethers and polyol aryl ethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, diethylene glycol monomethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250 degrees C. or less are preferable, since they not only function as wetting agents but also provide good drying property.

The proportion of the organic solvent in the ink is not particularly limited and can be suitably selected to suit to a particular application, but is preferably from 10% to 60% by mass, more preferably from 20% to 60% by mass, for drying property and discharge reliability of the ink.

Colorant

Examples of the colorant include, but are not limited to, pigments and dyes.

Usable pigments include both inorganic pigments and organic pigments. Each of these may be used alone or two or more of these may be used in combination. Mixed crystals can also be used as the colorant.

Usable pigments include black pigments, yellow pigments, magenta pigments, cyan pigments, white pigments, green pigments, orange pigments, glossy color pigments (e.g., gold pigments and silver pigments), and metallic pigments.

Specific examples of inorganic pigments include, but are not limited to, titanium oxide, iron oxide, calcium carbonate, barium sulfate, aluminum hydroxide, Barium Yellow, Cadmium Red, Chrome Yellow, and carbon black produced by a known method such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for solvents are preferable. In addition, hollow resin particles and hollow inorganic particles can also be used.

Specific examples of pigments used for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The dyes are not particularly limited, and acid dyes, direct dyes, reactive dyes, and basic dyes can be used. Each of these can be used alone or in combination with others.

Specific examples of the dyes include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the colorant in the ink is preferably from 0.1% to 15% by mass, more preferably from 1% to 10% by mass, for improving image density, fixability, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. This pigment may be referred to as a resin-covered pigment. In this case, not all the pigment particles included in the ink should be covered with a resin. It is possible that a part of the pigment particles is not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

For example, a nonionic surfactant RT-100 (available from Takemoto Oil & Fat Co., Ltd.) and sodium naphthalenesulfonate formalin condensate are preferably used as the dispersant.

Each of the above dispersants may be used alone or in combination with others.

Pigment Dispersion

The ink can be obtained by mixing a pigment with other materials such as water and an organic solvent. The ink can also be obtained by, first, preparing a pigment dispersion by mixing a pigment with water, a dispersant, etc., and thereafter mixing the pigment dispersion with other materials such as water and an organic solvent.

The pigment dispersion can be obtained by mixing water, a pigment, a pigment dispersant, and other components, if any, to disperse the pigment, and adjusting the particle diameter of the pigment. Preferably, the dispersing is performed by a disperser. The particle diameter of the pigment dispersed in the pigment dispersion is not particularly limited, but the number-based maximum frequency particle diameter is preferably in the range of from 20 to 500 nm, more preferably from 20 to 150 nm, for improving dispersion stability of the pigment and discharge stability and image quality (e.g., image density) of the ink. The particle diameter of the pigment can be measured with a particle size analyzer (NANOTRAC WAVE-UT151 available from MicrotracBEL Corp.).

The proportion of the pigment in the pigment dispersion is not particularly limited and can be suitably selected to suit to a particular application, but is preferably from 0.1% to 50% by mass, more preferably from 0.1% to 30% by mass, for improving discharge stability and enhancing image density.

Preferably, the pigment dispersion is subjected to filtration using a filter or a centrifugal separator to remove coarse particles, followed by degassing.

Water

The proportion of water in the ink is not particularly limited and can be suitably selected to suit to a particular application, but is preferably from 10% to 90% by mass, more preferably from 20% to 60% by mass, for drying property and discharge reliability of the ink.

The ink may further contain a defoamer, a preservative, a fungicide, and/or a corrosion inhibitor as trace additives.

Defoamer

Specific examples of the defoamer include, but are not limited to, silicone-based defoamers, polyether-based defoamers, and fatty-acid-ester-based defoamers. Each of these can be used alone or in combination with others. Among these defoamers, silicone-based defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

The ink according to an embodiment of the present invention may further contain a resin.

Resin

The type of the resin contained in the ink is not particularly limited and can be suitably selected to suit to a particular application. Specific examples thereof include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

Resin particles made of these resins may also be used. The resin particles may be dispersed in water as a dispersion medium to prepare a resin emulsion. The ink can be obtained by mixing the resin emulsion with other materials such as a colorant and an organic solvent. These resin particles are available either synthetically or commercially. The resin particles may include one type or two or more types of resin particles.

The volume average particle diameter of the resin particles is not particularly limited and can be suitably selected to suit to a particular application, but is preferably from 10 to 1,000 nm, more preferably from 10 to 200 nm, and particularly preferably from 10 to 100 nm, for good fixability and high image hardness.

The volume average particle diameter can be measured with a particle size analyzer (NANOTRAC WAVE-UT151 available from MicrotracBEL Corp.).

The proportion of the resin is not particularly limited and can be suitably selected to suit to a particular application. Preferably, the proportion of the resin in the ink is from 1% to 30% by mass, more preferably from 5% to 20% by mass, for fixability and storage stability of the ink.

The ink according to an embodiment of the present invention may be produced by dispersing or dissolving the above-described components in a water-based medium, followed by stirring and mixing, as necessary.

The stirring and mixing may be performed by a stirrer equipped with stirring blades, a magnetic stirrer, or a high-speed disperser.

The properties of the ink are not particularly limited and can be suitably selected to suit to a particular application. As an example, preferred viscosity, surface tension, and pH of the ink are described below.

Preferably, the viscosity of the ink at 25 degrees C. is from 5 to 30 mPa·s, more preferably from 5 to 25 mPa·s, for improving print density and text quality and enhancing dischargeability. The viscosity can be measured at 25 degrees C. by a rotatory viscometer (RE-80 L available from Toki Sangyo Co., Ltd.) equipped with a standard cone rotor (1°34'×R24), while setting the sample liquid amount to 1.2 mL, the number of rotations to 50 per minute (rpm), and the measuring time to 3 minutes.

Preferably, the surface tension of the ink is 35 mN/m or less, more preferably 32 mN/m or less, at 25 degrees C., so that the ink is suitably levelized on a recording medium and the drying time of the ink is shortened.

Preferably, the pH of the ink is from 7 to 12, more preferably from 8 to 11, for preventing corrosion of metal materials contacting the ink.

Recording Medium

The recording medium used in the present disclosure is particularly preferably a non-absorptive substrate.

In the present disclosure, the non-absorptive substrate refers to a substrate having a surface with a low level of moisture permeability, absorptivity, and/or adsorptivity. Examples thereof include a material having a number of hollow spaces inside but not opened to the exterior.

More quantitatively, the non-absorptive substrate refers to a substrate that absorbs water in an amount of 10 mL/m$^2$ or less from the start of contact to 30 msec$^{1/2}$ thereafter, when measured according to the Bristow's method.

In particular, it is confirmed that the ink exhibits uniform wettability and spreadability on polypropylene films, polyethylene terephthalate films, and nylon films, among the non-absorptive substrates.

Specific examples of the polypropylene films include, but are not limited to: P-2002, P-2161, and P-4166 (available from Toyobo Co., Ltd.); PA-20, PA-30, and PA-20 W (available from SUN•TOX Co., Ltd.); and FOA, FOS, and FOR (available from Futamura Chemical Co., Ltd.).

Specific examples of the polyethylene terephthalate films include, but are not limited to: E-5100 and E-5102 (available from Toyobo Co., Ltd.); P60 and P375 (available from Toray Industries, Inc.); and G2, G2P2, K, and SL (available from Teijin DuPont Films Japan Limited).

Specific examples of the nylon films include, but are not limited to: HARDEN FILM N-1100, N-1102, and N-1200

(available from Toyobo Co., Ltd.); and ON, NX, MS, and NK (available from UNITIKA LTD.).

Recording Apparatus and Recording Method

The ink according to an embodiment of the present invention can be suitably applied to various recording apparatuses employing an inkjet recording method, such as printers, facsimile machines, photocopiers, multifunction peripherals (having the functions of printer, facsimile machine, and photocopier), and three-dimensional objects forming apparatuses.

In the present disclosure, the recording apparatus and the recording method respectively refer to an apparatus capable of discharging inks or various treatment liquids onto a recording medium and a method for recording an image on the recording medium using the apparatus. The recording medium refers to an article to which the inks or the various treatment liquids can be attached at least temporarily.

The recording apparatus may further optionally include, in addition to an ink discharge head, devices relating to feeding, conveying, and ejecting of the recording medium and other devices referred to as a pretreatment device or an aftertreatment device.

The recording apparatus may further optionally include a heater for use in a heating process and a dryer for use in a drying process. Examples of the heater and the dryer include, but are not limited to, devices for heating and drying the printed surface and the reverse surface of a recording medium. The heater and the dryer are not particularly limited. Specific examples thereof include, but are not limited to, a fan heater and an infrared heater. The heating process and the drying process may be performed either before, during, or after printing.

In addition, the recording apparatus and the recording method are not limited to those producing merely meaningful visible images such as texts and figures with the ink. For example, the recording apparatus and the recording method can produce patterns like geometric design and three-dimensional images.

The recording apparatus includes both a serial-type device in which the discharge head is moved and a line-type device in which the discharge head is not moved, unless otherwise specified.

Furthermore, in addition to a desktop apparatus, the recording apparatus includes an apparatus capable of printing images on a wide recording medium with A0 size and a continuous printer capable of using continuous paper reeled up in a roll form as recording media.

Figure 2:
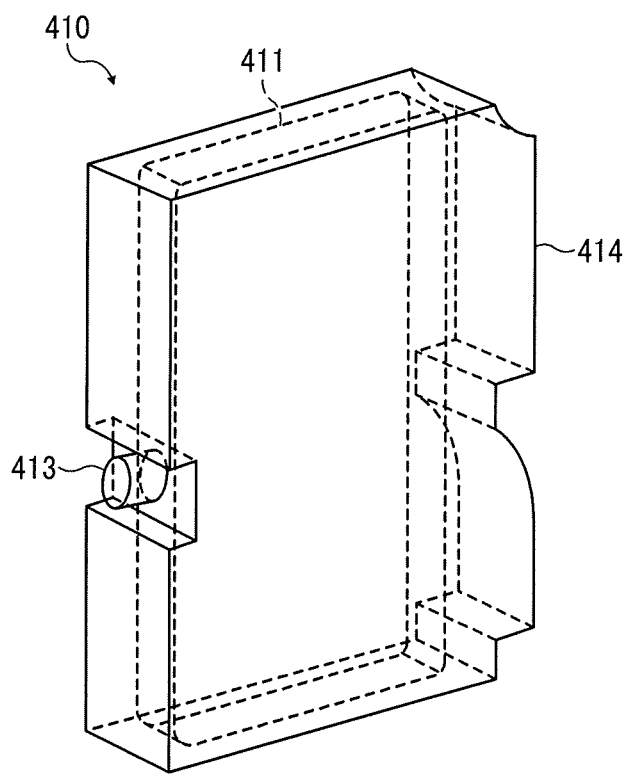
FIG. 2 is a perspective view of a main tank for accommodating an ink according to an embodiment of the present invention.

One example of the recording apparatus is described in detail below with reference to FIGS. 1 and 2. FIG. 1 is a perspective view of the recording apparatus. FIG. 2 is a perspective view of a main tank. An image forming apparatus 400, as one example of the recording apparatus, is a serial-type image forming apparatus. A mechanical unit 420 is disposed in a housing 401 of the image forming apparatus 400. Main tanks 410k, 410c, 410m, and 410y for respective colors of black (K), cyan (C), magenta (M), and yellow (Y) (hereinafter each referred to as "main tank 410") are each equipped with an ink container 411 made of a packaging material such as an aluminum laminate film. The ink container 411 is accommodated in a container casing 414 made of plastic. As a result, the main tank 410 is used as an ink cartridge of each color.

A cartridge holder 404 is disposed on the rear side of the opening when a cover 401c of the apparatus body is opened. The main tank 410 is detachably attachable to the cartridge holder 404. Thus, each ink discharging outlet 413 of the main tank 410 communicates with a discharge head 434 for each color via a supplying tube 436 for each color so that the ink can be discharged from the discharge head 434 to a recording medium.

The recording apparatus may further optionally include, in addition to an ink discharge head, a pretreatment device and/or an aftertreatment device.

As an example, the pretreatment device and the aftertreatment device may be provided as a liquid discharger including a liquid container containing the pretreatment or aftertreatment liquid and a liquid discharge head to discharge the pretreatment or aftertreatment liquid by inkjet recording method, having a similar configuration to the liquid discharger for each of the black (K), cyan (C), magenta (M), and yellow (Y) inks.

As another example, the pretreatment device and the aftertreatment device may be provided as a device employing a method other than inkjet recording method, such as blade coating, roll coating, and spray coating.

The ink may be applied not only to inkjet recording but also to other methods in various fields. Specific examples of such methods other than inkjet recording include, but are not limited to, blade coating, gravure coating, bar coating, roll coating, dip coating, curtain coating, slide coating, die coating, and spray coating.

Printed Matter

The printed matter according to an embodiment of the present invention comprises a print medium and a print layer. The print layer comprises a colorant, an organic solvent, and a surfactant.

The organic solvent comprises a glycol ether having a solubility parameter of from 9.0 to 12.0 $(cal/cm^3)^{1/2}$.

The surfactant comprises a silicone-based surfactant (a) and a nonionic surfactant (b).

The printed matter may be manufactured by an inkjet recording apparatus and an inkjet recording method using the ink according to an embodiment of the present invention.

In the present disclosure, "image forming", "recording", and "printing" are treated as synonymous terms.

In addition, "recording medium", "medium", and "print medium" are synonyms.

EXAMPLES

Further understanding can be obtained by reference to certain specific examples which are provided herein for the purpose of illustration only and are not intended to be limiting. In the descriptions in the following examples, the numbers in parts represent mass ratios in parts, and "%" represents "% by mass", unless otherwise specified.

Preparation of Black Pigment Dispersion

First, 100 g of a carbon black BLACK PEARLS (registered trademark) 1000 available from Cabot Corporation (having a BET specific surface area of 343 $m^2/g$ and a DBPA of 105 mL/100 g) was added to 3,000 mL of a 2.5N (normality) sodium hypochlorite solution and subjected to an oxidation treatment for 10 hours while being stirred at a revolution of 300 rpm and a temperature of 60 degrees C. Thus, a pigment having a carboxylic acid group on the surface of the carbon black was prepared.

The reaction solution was filtered, and the carbon black separated by filtration was neutralized with a sodium hydroxide solution and subjected to ultrafiltration.

The resulting pigment dispersion was subjected to ultrafiltration with a dialysis membrane using ion-exchange water and thereafter to ultrasonic dispersion. Thus, a black pigment dispersion was prepared having been condensed to have a solid content concentration of 20%.

Preparation of Cyan Pigment Dispersion

A cyan pigment dispersion was prepared in the same manner as the black pigment dispersion except that the carbon black was replaced with Pigment Blue 15:4 (SMART Cyan 3154BA available from Sensient Technologies Corporation).

Preparation of Magenta Pigment Dispersion

A magenta pigment dispersion was prepared in the same manner as the black pigment dispersion except that the carbon black was replaced with Pigment Red 122 (Pigment Red 122 available from Sun Chemical Corporation).

Preparation of Yellow Pigment Dispersion

A yellow pigment dispersion was prepared in the same manner as the black pigment dispersion except that the carbon black was replaced with Pigment Yellow 74 (SMART Yellow 3074BA available from Sensient Technologies Corporation).

Examples 1 to 12 and Comparative Examples 1 to 5

Preparation of Inks

The materials described in Table 1 were mixed, stirred for one hour, and pressure-filtered with a 0.8-μm cellulose acetate membrane filter. Thus, inks of Examples 1 to 12 and Comparative Examples 1 to 5 were each prepared.

The silicone-based surfactants can be classified as follows.

Silicone-based surfactant having a structure represented by the structural formula (1)
  WET-270 (available from Evonik Industries AG)
  BYK-348 (available from BYK Additives & Instruments)
  SAG 503 A (available from Nissin Chemical Industry Co., Ltd.)

Silicone-based surfactant free of a structure represented by the structural formula (1)
  BYK-333 (available from BYK Additives & Instruments)

In Table 1, FS-300 represents a fluorine-based surfactant (available from The Chemours Company), and PROXEL LV represents a preservative-fungicide (available from Lonza).

TABLE 1

| | | Ink Components | Example 1 | Example 2 | Example 3 | Example 4 | Example 5 | Example 6 |
|---|---|---|---|---|---|---|---|---|
| Pigment Dispersion | | Black Pigment Dispersion | 20 | | 20 | | | 20 |
| | | Cyan Pigment Dispersion | | 20 | | | | |
| | | Magenta Pigment Dispersion | | | | 20 | | |
| | | Yellow Pigment Dispersion | | | | | 20 | |
| Surfactant | Silicon-based | BYK-333 | 1 | 1 | 1 | 1 | 1 | |
| | | WET-270 | | | | | | 1 |
| | | BYK-348 | | | | | | |
| | | SAG503A | | | | | | |
| | Nonionic | RHEODOL MO-60 (HLB = 2.8) | 1 | | | 1 | 1 | 1 |
| | | EMASOL L-10V (HLB = 8.6) | | 1 | 1 | | | |
| | | RHEODOL AO-15V (HLB = 3.7) | | | | | | |
| | | EnviroGem ® AD01 (HLB = 4.0) | | | | | | |
| | | EMULGEN 102KG (HLB = 6.3) | | | | | | |
| | | FS-300 | | | | | | |
| Organic Solvent | Glycol Ether | 1,2-Propanediol | 20 | 20 | 20 | 20 | 20 | 20 |
| | | 3-Methoxy-3-methyl-1-butanol (SP = 9.6 [cal/cm$^3$]$^{1/2}$) | 5 | 10 | | | | 15 |
| | | 2,2'-Oxybis-1-propanol (SP = 11.7 [cal/cm$^3$]$^{1/2}$) | | | 10 | | | |
| | | Tripropylene Glycol n-Butyl Ether (SP = 9.3 [cal/cm$^3$]$^{1/2}$) | | | | 10 | | |
| | | 1-Methoxy-2-propanol (SP = 10.2 [cal/cm$^3$]$^{1/2}$) | | | | | 10 | |
| | | Dipropylene Glycol Dimethyl Ether (SP = 7.9 [cal/cm$^3$]$^{1/2}$) | | | | | | |
| | | Diethylene Glycol (SP = 13.0 [cal/cm$^3$]$^{1/2}$) | | | | | | |
| | | n-Hexanol (SP = 9.8 [cal/cm$^3$]$^{1/2}$) | | | | | | |
| Preservative | | PROXEL LV | 0.1 | 0.1 | 0.1 | 0.1 | 0.1 | 0.1 |
| Water | | Ion-exchange Water | Remaining Amount | Remaining Amount | Remaining Amount | Remaining Amount | Remaining Amount | Remaining Amount |
| | | Total (% by mass) | 100 | 100 | 100 | 100 | 100 | 100 |

| | | Ink Components | Example 7 | Example 8 | Example 9 | Example 10 | Example 11 | Example 12 |
|---|---|---|---|---|---|---|---|---|
| Pigment Dispersion | | Black Pigment Dispersion | | | | 20 | 20 | 20 |
| | | Cyan Pigment Dispersion | 20 | | | | | |
| | | Magenta Pigment Dispersion | | 20 | | | | |
| | | Yellow Pigment Dispersion | | | 20 | | | |
| Surfactant | Silicon-based | BYK-333 | | | | 1 | 1 | 1 |
| | | WET-270 | | | | | | |
| | | BYK-348 | 1 | | | | | 1 |
| | | SAG503A | | | 1 | | | |
| | Nonionic | RHEODOL MO-60 (HLB = 2.8) | 1 | | 1 | | | |
| | | EMASOL L-10V (HLB = 8.6) | | | | | | |

TABLE 1-continued

| | Ink Components | | | | | | |
|---|---|---|---|---|---|---|---|
| | RHEODOL AO-15V (HLB = 3.7) | | 1 | | | | |
| | EnviroGem ® AD01 (HLB = 4.0) | | | 1 | | 1 | 1 |
| | EMULGEN 102KG (HLB = 6.3) | | | | | 1 | |
| | FS-300 | | | | | | |
| Organic Solvent | 1,2-Propanediol | 20 | 20 | 20 | 20 | 20 | 20 |
| | Glycol Ether 3-Methoxy-3-methyl-1-butanol (SP = 9.6 [cal/cm$^3$]$^{1/2}$) | 10 | 10 | 10 | 10 | 10 | |
| | 2,2'-Oxybis-1-propanol (SP = 11.7 [cal/cm$^3$]$^{1/2}$) | | | | | | |
| | Tripropylene Glycol n-Butyl Ether (SP = 9.3 [cal/cm$^3$]$^{1/2}$) | | | | | | |
| | 1-Methoxy-2-propanol (SP = 10.2 [cal/cm$^3$]$^{1/2}$) | | | | | | 10 |
| | Dipropylene Glycol Dimethyl Ether (SP = 7.9 [cal/cm$^3$]$^{1/2}$) | | | | | | |
| | Diethylene Glycol (SP = 13.0 [cal/cm$^3$]$^{1/2}$) | | | | | | |
| | n-Hexanol (SP = 9.8 [cal/cm$^3$]$^{1/2}$) | | | | | | |
| Preservative | PROXEL LV | 0.1 | 0.1 | 0.1 | 0.1 | 0.1 | 0.1 |
| Water | Ion-exchange Water | Remaining Amount | Remaining Amount | Remaining Amount | Remaining Amount | Remaining Amount | Remaining Amount |
| | Total (% by mass) | 100 | 100 | 100 | 100 | 100 | 100 |

| | Ink Components | | Comparative Example 1 | Comparative Example 2 | Comparative Example 3 | Comparative Example 4 | Comparative Example 5 |
|---|---|---|---|---|---|---|---|
| Pigment Dispersion | Black Pigment Dispersion | | 20 | 20 | 20 | 20 | 20 |
| | Cyan Pigment Dispersion | | | | | | |
| | Magenta Pigment Dispersion | | | | | | |
| | Yellow Pigment Dispersion | | | | | | |
| Surfactant | Silicon-based | BYK-333 | | | | | |
| | | WET-270 | 1 | 1 | 1 | 1 | |
| | | BYK-348 | | | | | |
| | | SAG503A | | | | | |
| | Nonionic | RHEODOL MO-60 (HLB = 2.8) | | | | | |
| | | EMASOL L-10V (HLB = 8.6) | | | | | |
| | | RHEODOL AO-15V (HLB = 3.7) | | | 1 | | 1 |
| | | EnviroGem ® AD01 (HLB = 4.0) | 1 | | | | |
| | | EMULGEN 102KG (HLB = 6.3) | | 1 | | | |
| | | FS-300 | | | | 1 | 1 |
| Organic Solvent | | 1,2-Propanediol | 20 | 20 | 20 | 20 | 20 |
| | Glycol Ether | 3-Methoxyl-3-methyl-1-butanol (SP = 9.6 [cal/cm$^3$]$^{1/2}$) | | | | | |
| | | 2,2'-Oxybis-1-propanol (SP = 11.7 [cal/cm$^3$]$^{1/2}$) | | | | | |
| | | Tripropylene Glycol n-Butyl Ether (SP = 9.3 [cal/cm$^3$]$^{1/2}$) | | | | | |
| | | 1-Methoxy-2-propanol (SP = 10.2 [cal/cm$^3$]$^{1/2}$) | | | | 10 | 10 |
| | | Dipropylene Glycol Dimethyl Ether (SP = 7.9 [cal/cm$^3$]$^{1/2}$) | 10 | | | | |
| | | Diethylene Glycol (SP = 13.0 [cal/cm$^3$]$^{1/2}$) | | 10 | | | |
| | | n-Hexanol (SP = 9.8 [cal/cm$^3$]$^{1/2}$) | | | 10 | | |
| Preservative | | PROXEL LV | 0.1 | 0.1 | 0.1 | 0.1 | 0.1 |
| Water | | Ion-exchange Water | Remaining Amount | Remaining Amount | Remaining Amount | Remaining Amount | Remaining Amount |
| | | Total (% by mass) | 100 | 100 | 100 | 100 | 100 |

Evaluation of Wettability of Ink

An ink jet printer (IPSiO GXe5500 available from Ricoh Co., Ltd.) was filled with each of the above-prepared inks to print a 4-pl 1-dot image and a 2-pl 1-dot image on various films of PP (polypropylene), PET (polyethylene terephthalate), and ONY (oriented nylon). The dot diameter on each film was measured with a digital microscope (DIGITAL MICROSCOPE VHX-200 available from Keyence Corporation).

In this evaluation, the difference between the maximum dot diameter and the minimum dot diameter among the three types of substrates was ranked according to the following criteria. The ranks A and B are acceptable levels.

Evaluation Criteria

A: The difference between the maximum dot diameter and the minimum dot diameter among the substrates is 0 μm or more and less than 3 μm.

B: The difference between the maximum dot diameter and the minimum dot diameter among the substrates is 3 μm or more and less than 5 μm.

C: The difference between the maximum dot diameter and the minimum dot diameter among the substrates is 5 μm or more and less than 10 μm.

D: The difference between the maximum dot diameter and the minimum dot diameter among the substrates is 10 μm or more and less than 20 μm.

The manufacturer names and grades of the various films used in the evaluation of wettability of the inks are as follows.

PP: PYLEN® P2102 available from Toyobo Co., Ltd.
PET: ESPET® E5100 available from Toyobo Co., Ltd.
ONY: HARDEN® N1100 available from Toyobo Co., Ltd.

TABLE 2

|  | Example 1 | Example 2 | Example 3 | Example 4 | Example 5 | Example 6 |
|---|---|---|---|---|---|---|
| 4-pl 1-Dot Image | B | B | A | A | A | A |
| 2-pl 1-Dot Image | B | B | B | B | B | B |

|  | Example 7 | Example 8 | Example 9 | Example 10 | Example 11 | Example 12 |
|---|---|---|---|---|---|---|
| 4-pl 1-Dot Image | A | A | B | B | B | A |
| 2-pl 1-Dot Image | B | B | A | A | A | A |

|  | Comparative Example 1 | Comparative Example 2 | Comparative Example 3 | Comparative Example 4 | Comparative Example 5 |
|---|---|---|---|---|---|
| 4-pl 1-Dot Image | B | B | D | C | C |
| 2-pl 1-Dot Image | C | C | C | D | D |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An ink, comprising:
a colorant;
water;
an organic solvent comprising a glycol ether having a solubility parameter of from 9.0 to 12.0 $(cal/cm^3)^{1/2}$; and
a surfactant comprising a silicone-based surfactant (a) and a nonionic surfactant (b),
wherein the ink comprises the organic solvent in a range of from 20% to 60% by mass, and
wherein the nonionic surfactant (b) has a hydrophilic-lipophilic balance of from 3.0 to 7.0.

2. The ink according to claim 1, wherein the glycol ether comprises a propylene glycol alkyl ether.

3. The ink according to claim 2, wherein the propylene glycol alkyl ether comprises a propylene glycol monomethyl ether.

4. The ink according to claim 1, wherein the silicone-based surfactant (a) comprises a compound represented by the following structural formula (1):

Structural Formula (1)

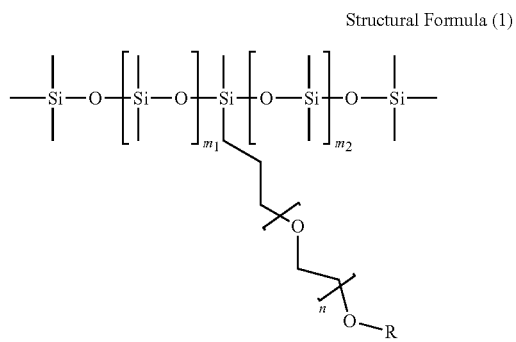

where R represents a hydrogen atom or methyl group, each of $m_1$ and $m_2$ independently represents an integer of from 0 to 6, and n represents an integer of from 3 to 19.

5. An inkjet printing method, comprising:
discharging the ink according to claim 1.

6. The ink according to claim 1, wherein the glycol ether is 1-methoxy-2-propanol or 2-methoxy-1-propanaol.

7. The ink according to claim 1, wherein the ink comprises the glycol ether in a range of from 1% to 20% by mass.

8. The ink according to claim 1, wherein the ink comprises the glycol ether in a range of from 3% to 15% by mass.

9. The ink according to claim 1, wherein the surfactant further comprises a fluorine-based surfactant, an ampholytic surfactant, and/or an anionic surfactant.

10. The ink according to claim 1, wherein the ink comprises the silicone-based surfactant (a) in a range of from 0.1% to 3.0% by mass.

11. The ink according to claim 1, wherein the ink comprises the nonionic surfactant (b) in a range of from 0.01% to 2.0% by mass.

12. The ink according to claim 1, wherein the ink comprises the colorant in a range of from 0.1% to 15% by mass.

13. The ink according to claim 1, wherein the ink comprises the water in a range of from 20% to 60% by mass.

14. The ink according to claim 1, wherein the ink further comprises at least one additive selected from the group consisting of a defoamer, a preservative, a fungicide, and a corrosion inhibitor.

15. The ink according to claim 1, wherein the ink further comprises a resin.

16. The ink according to claim 1, wherein a viscosity of the ink at 25 degrees C. is from 5 to 30 mPa·s.

17. The ink according to claim 1, wherein a surface tension of the ink is 35 mN/m or less at 25 degrees C.

18. The ink according to claim 1, wherein a pH of the ink is from 7 to 12.

* * * * *